United States Patent
Igarashi

(10) Patent No.: US 9,817,617 B2
(45) Date of Patent: Nov. 14, 2017

(54) IMAGE PROCESSING APPARATUS THAT IS ABLE TO CHANGE WHETHER TO DISPLAY A DISPLAY ITEM RELATED TO A PRINT CONTROLLER ACCORDING TO CIRCUMSTANCES, METHOD FOR CONTROLLING SUCH AN IMAGE PROCESSING APPARATUS, AND STORAGE MEDIUM FOR STORING INSTRUCTIONS WHICH WHEN EXECUTED PERFORM SUCH A METHOD

(71) Applicant: CANON KABUSHIKI KAISHA, Tokyo (JP)

(72) Inventor: Hiroya Igarashi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/240,897

(22) Filed: Aug. 18, 2016

(65) Prior Publication Data
US 2017/0060500 A1 Mar. 2, 2017

(30) Foreign Application Priority Data

Aug. 27, 2015 (JP) .................................. 2015-168292

(51) Int. Cl.
*G06F 3/12* (2006.01)
*H04N 1/00* (2006.01)

(52) U.S. Cl.
CPC .......... *G06F 3/1236* (2013.01); *G06F 3/1204* (2013.01); *G06F 3/1285* (2013.01); *H04N 1/00411* (2013.01)

(58) Field of Classification Search
None
See application file for complete search history.

(56) References Cited

U.S. PATENT DOCUMENTS

| | | | | |
|---|---|---|---|---|
| 2002/0080391 A1* | 6/2002 | Sugiura | ................. | G06F 3/1204 358/1.15 |
| 2004/0046987 A1* | 3/2004 | Mima | ................ | H04N 1/00244 358/1.14 |
| 2006/0072140 A1* | 4/2006 | Mitani | .................. | G06F 3/1205 358/1.13 |
| 2006/0158674 A1* | 7/2006 | Mizoguchi | ............ | G06F 3/1205 358/1.13 |
| 2007/0185979 A1* | 8/2007 | Yoshida | ................ | G06F 3/1204 709/220 |

(Continued)

FOREIGN PATENT DOCUMENTS

JP 2015-049831 A 3/2015

*Primary Examiner* — Ming Hon
(74) *Attorney, Agent, or Firm* — Canon U.S.A., Inc. IP Division

(57) ABSTRACT

An image processing apparatus performs processing for registering information about a print controller communicably connected to the image processing apparatus. The image processing apparatus performs control to display on an operation panel a display item related to a print controller about which information is registered by the registration processing and which is able to communicate with the image processing apparatus, and not to display on the operation panel a display item related to a print controller about which information is registered by the registration processing and which is not able to communicate with the image processing apparatus.

10 Claims, 18 Drawing Sheets

| SHORTCUT NAME | URL | FAVICON STORAGE FOLDER | LEAVE FAVICON |
|---|---|---|---|
| CONTROLLER A | https://111.111.111.111/top.html | CONTROLLER A | FALSE |
| FAVORITE 1 | http://www.sample-favorite1.com/ | NULL | TRUE |
| CONTROLLER B | https://222.222.222.222/top.html | CONTROLLER B | TRUE |

(56) References Cited

U.S. PATENT DOCUMENTS

| | | | | |
|---|---|---|---|---|
| 2009/0251726 | A1* | 10/2009 | Suzue | H04N 1/00214 358/1.15 |
| 2013/0003111 | A1* | 1/2013 | Mitsubori | H04L 43/0811 358/1.15 |
| 2013/0111045 | A1* | 5/2013 | Ichikawa | H04L 67/143 709/228 |
| 2013/0148155 | A1* | 6/2013 | Kitagata | G06F 3/1294 358/1.15 |
| 2013/0235402 | A1* | 9/2013 | Yamamichi | G06F 3/1204 358/1.13 |
| 2013/0301080 | A1* | 11/2013 | Nakata | G06F 3/1204 358/1.15 |
| 2015/0055176 | A1* | 2/2015 | Ochi | G06F 3/1285 358/1.15 |
| 2015/0062645 | A1* | 3/2015 | Yamakawa | G06F 3/1236 358/1.15 |
| 2015/0138580 | A1* | 5/2015 | Tse | H04N 1/00949 358/1.13 |
| 2015/0199157 | A1* | 7/2015 | Xiao | G06F 3/1236 358/1.15 |
| 2015/0261482 | A1* | 9/2015 | Takano | G06F 3/1205 358/1.15 |

* cited by examiner

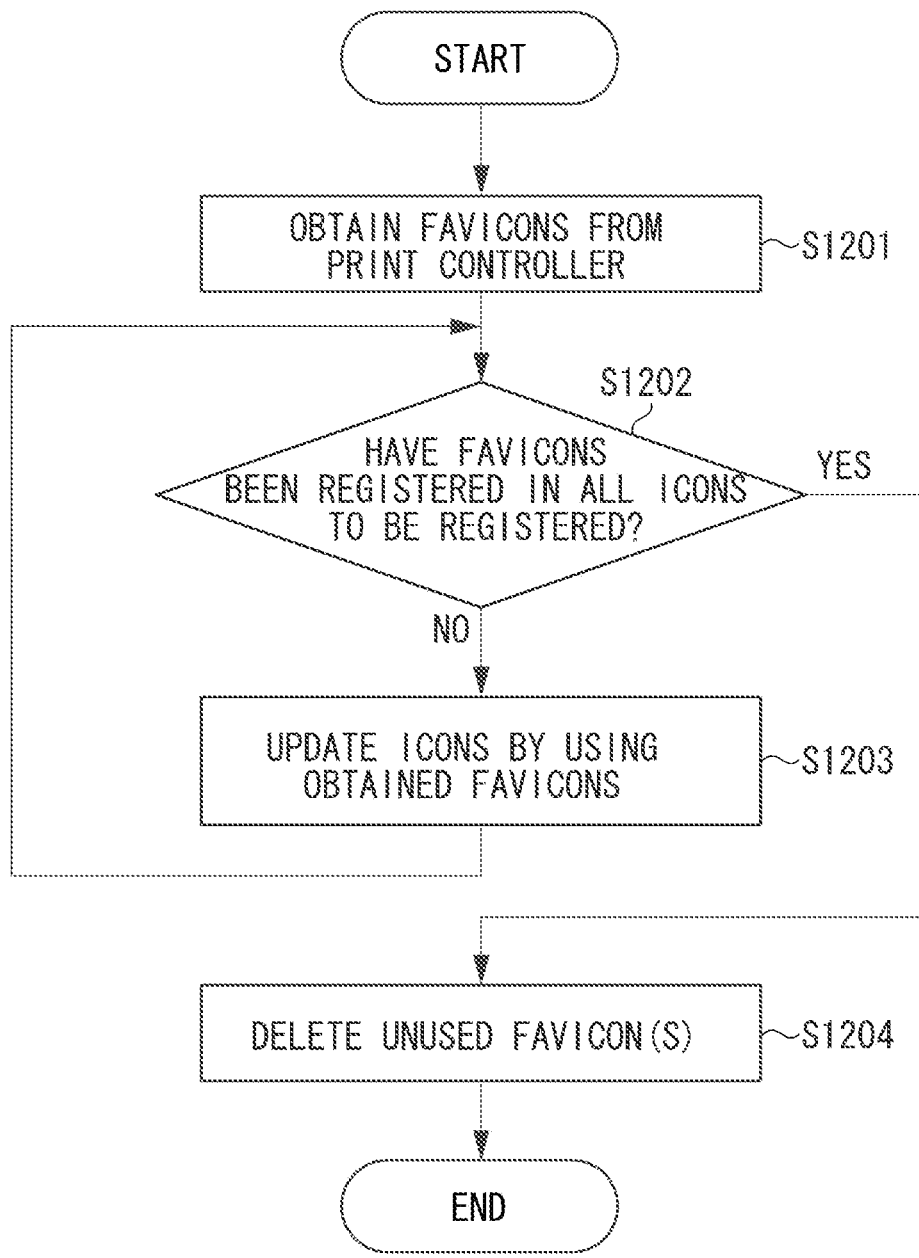

FIG. 13A

| 20150708143000_favicon_32x32.png |
| 20150708143000_favicon_48x48.png |
| 20150708143000_favicon_64x64.png |
| 20150708143000_favicon_80x80.png |
| 20150708143000_favicon_96x96.png |

FIG. 13B

| 20150708143000_favicon_48x48.png |
| 20150708143000_favicon_96x96.png |
|  |
|  |
|  |

FIG. 14

| SHORTCUT NAME | URL | FAVICON STORAGE FOLDER |
|---|---|---|
| FAVORITE 1 | http://www.sample-favorite1.com/ | null |
| FAVORITE 2 | http://www.sample-favorite2.com/ | sample2 |

FIG. 15

| SHORTCUT NAME | URL | FAVICON STORAGE FOLDER | LEAVE FAVICON |
|---|---|---|---|
| NULL | null | CONTROLLER A | TRUE |
| FAVORITE 1 | http://www.sample-favorite1.com/ | NULL | FALSE |
| CONTROLLER B | https://222.222.222.222/top.html | CONTROLLER B | TRUE |

FIG. 18

| SHORTCUT NAME | URL | FAVICON STORAGE FOLDER | LEAVE FAVICON |
|---|---|---|---|
| CONTROLLER A | https://111.111.111.111/top.html | CONTROLLER A | FALSE |
| FAVORITE 1 | http://www.sample-favorite1.com/ | NULL | TRUE |
| CONTROLLER B | https://222.222.222.222/top.html | CONTROLLER B | TRUE |

IMAGE PROCESSING APPARATUS THAT IS ABLE TO CHANGE WHETHER TO DISPLAY A DISPLAY ITEM RELATED TO A PRINT CONTROLLER ACCORDING TO CIRCUMSTANCES, METHOD FOR CONTROLLING SUCH AN IMAGE PROCESSING APPARATUS, AND STORAGE MEDIUM FOR STORING INSTRUCTIONS WHICH WHEN EXECUTED PERFORM SUCH A METHOD

BACKGROUND OF THE INVENTION

Field of the Invention

The present invention relates to an image processing apparatus, a method for controlling an image processing apparatus, and a storage medium.

Description of the Related Art

Web user interfaces using a web browser have recently come to be used as user interfaces. Also some image processing apparatuses include a browser function. Japanese Patent Application Laid-Open No. 2015-49831 discusses an image processing apparatus that determines a print controller to be connected and registers a web page of the connected print controller as a favorite in a web browser.

According to Japanese Patent Application Laid-Open No. 2015-49831, if a first print controller connected to the image processing apparatus is disconnected and another second print controller is connected, the second print controller is registered as a favorite in addition to the first print controller. According to Japanese Patent Application Laid-Open No. 2015-49831, each time a new print controller is connected, the new print controller is added to favorites. This increases the number of print controllers displayed as favorites and lowers visibility.

SUMMARY OF THE INVENTION

According to an embodiment of the present invention, an image processing apparatus includes a display unit, a registration unit configured to register information about a print controller communicably connected to the image processing apparatus, and a control unit configured to perform control to display on the display unit a display item related to a print controller about which information is registered by the registration information and which is able to communicate with the image processing apparatus, and not to display on the display unit a display item related to a print controller about which information is registered by the registration unit and which is not able to communicate with the image processing apparatus. The registration unit and the control unit are implemented by one or more processors.

Further features of the present invention will become apparent from the following description of exemplary embodiments with reference to the attached drawings.

BRIEF DESCRIPTION OF THE DRAWINGS

FIG. 12 is a flowchart for describing control according to the third exemplary embodiment of the present invention.

FIGS. 13A and 13B illustrate examples of a favicon list according to the third exemplary embodiment of the present invention.

FIG. 14 illustrates an example of a favorite management table according to an exemplary embodiment of the present invention.

FIG. 15 illustrates an example of a favorite management table according to the second exemplary embodiment.

FIG. 18 illustrates an example of a favorite management table according to a fourth exemplary embodiment of the present invention.

DESCRIPTION OF THE EMBODIMENTS

A configuration for carrying out the present invention will be described below with reference to the drawings.

Figure 1:
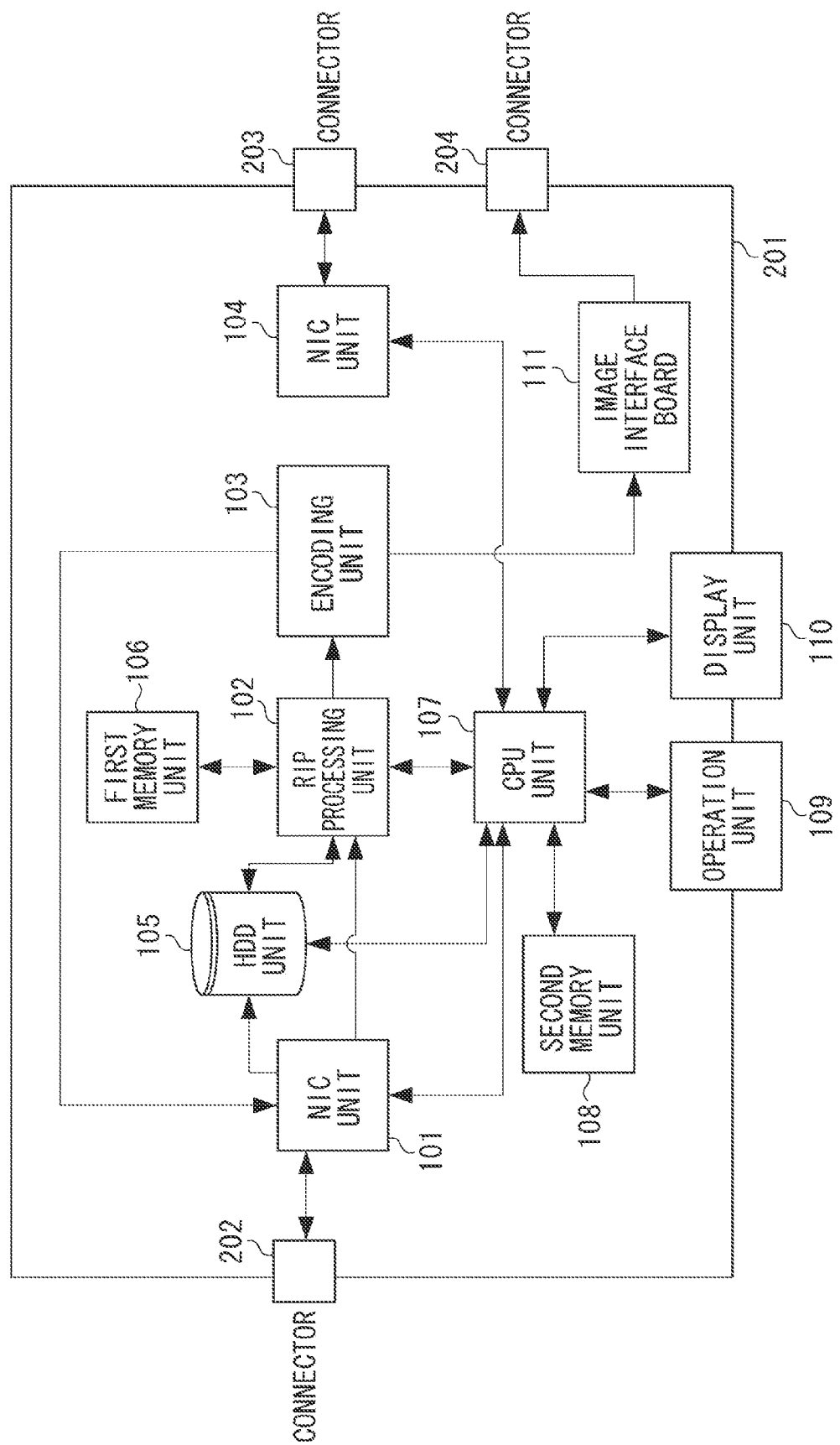
FIG. 1 is a block diagram illustrating a configuration of a print controller which illustrates an exemplary embodiment of the present invention.
Figure 2A:
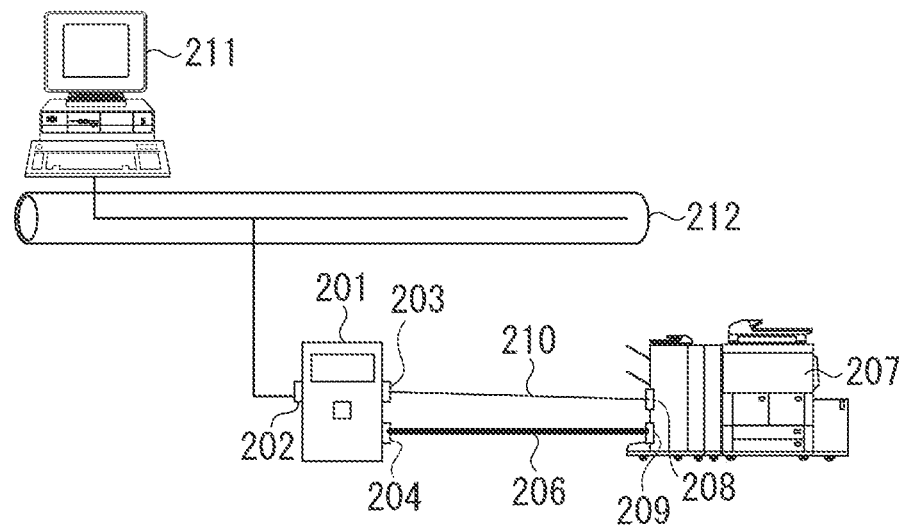
FIGS. 2A and 2B are schematic diagrams of connection configurations between the print controller and an image processing apparatus which illustrate an exemplary embodiment of the present invention.

FIG. 1 is a block diagram illustrating a schematic configuration example of a print controller 201. FIG. 2A is a connection diagram of the print controller 201 and an image processing apparatus 207. In FIG. 1, a network interface card (NIC) unit 101 is a first network interface for controlling a low layer level connection with a local area network (LAN) 212 in FIG. 2. A raster image processor (RIP) processing unit 102 is intended to render a received print language, such as a page description language (PDL), or specific data format (compressed by a Joint Bi-level Image Experts Group (JBIG) standard) into a raster image. An encoding unit 103 is intended to convert the raster image data into a form of print data or a data format supported by the image processing apparatus 207. A NIC unit 104 serves as a second network interface for controlling a low layer level connection. A hard disk drive (HDD) unit 105 is intended to temporarily store (spool) print data received by the NIC unit 101 or temporarily store RIP'ed compression data. A first memory unit 106 is intended to be used by the RIP unit 102 for image rendering processing. A central processing unit (CPU) unit 107 governs control of the entire print controller 201. The CPU unit 107 uses a second memory unit 108 as a temporary data storage area. An operation unit 109 includes buttons, keys, and a touch panel, and is intended to carry out an operation on the print controller 201. A display unit 110 is intended to notify an operator of information by using images and text. A connector 204 is intended to connect with an image interface board 111. The image interface board 111 and the connector 204 are used to form a dedicated transmission path and transfer image data. Data packets from a terminal apparatus 211 to the print controller 201 are propagated through the LAN 212 and taken in to the print controller 201 via a connector 202. In the print controller 201, the NIC unit 101 performs data reception processing. If print data is received, the CPU unit 107 performs control to write the received data to the HDD unit 105 as needed. Such an operation is referred to as queuing (spooling) which is typically performed for the purpose of improving data transfer speed. The data stored in the HDD unit 105 is read by the RIP processing 102 according to an instruction from the CPU unit 107. Print data that has not been queued is directly transferred to the RIP processing unit 102 according to an instruction from the CPU 107.

The RIP processing unit 102 performs image rasterization processing on the print data thus transmitted to the RIP processing unit 102. At the time of image rasterization, the RIP processing unit 102 determines whether the image processing apparatus 207 can perform printing according to settings. The encoding unit 103 then performs encoding into a data format interpretable by the image processing apparatus 207 based on the previously-set data format interpretable by the image processing apparatus 207 and the format of the received data. The encoding unit 103 functions as a second determination unit and a data format conversion unit. Such encoding processing is performed according to need, and may thus be skipped if encoding is not needed like in a case where the format of the received print data itself is interpretable by the image processing apparatus 207. The encoded data needs to be in a format interpretable by the image processing apparatus 207. For example, the format varies depending on the capabilities of an interpretation unit built in the image processing apparatus 207, for example, a specific print language format or a data format compressed by a specific method such as JBIG.

The NIC unit 104 converts the data encoded as needed into data packets again for the purpose of transmission to a LAN 210. The data packets are transmitted from a connector 203 to the image processing apparatus 207 via the LAN 210 and a connector 208. The image processing apparatus 207 which receives the data packets performs print processing on a recording medium such as paper, according to its own print processing procedure. As another data transfer method, the data may be transferred to the image interface board 111 via the encoding unit 103. The data is passed through the connector 204 and a dedicated transmission path 206, and transmitted to the image processing apparatus 207 via a connector 209.

Figure 2B:
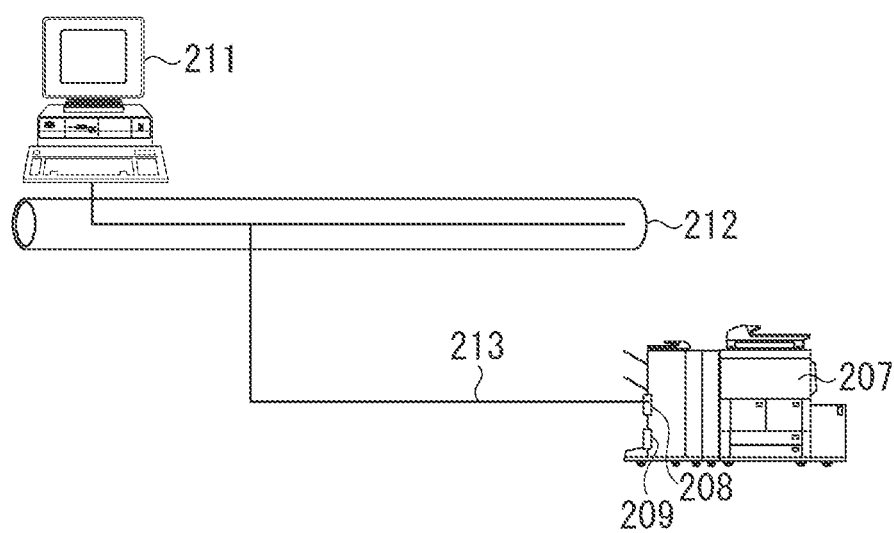

FIG. 2B is a connection diagram when the image processing apparatus 207 is connected without the print controller 201. A print job from the terminal apparatus 211 is transmitted to the image processing apparatus 207 via the LAN 212 and a LAN 213. The functions of the print controller 201 in FIG. 2A, such as the RIP processing unit 102, are provided by the image processing apparatuses 207. Details will be omitted.

Figure 3:
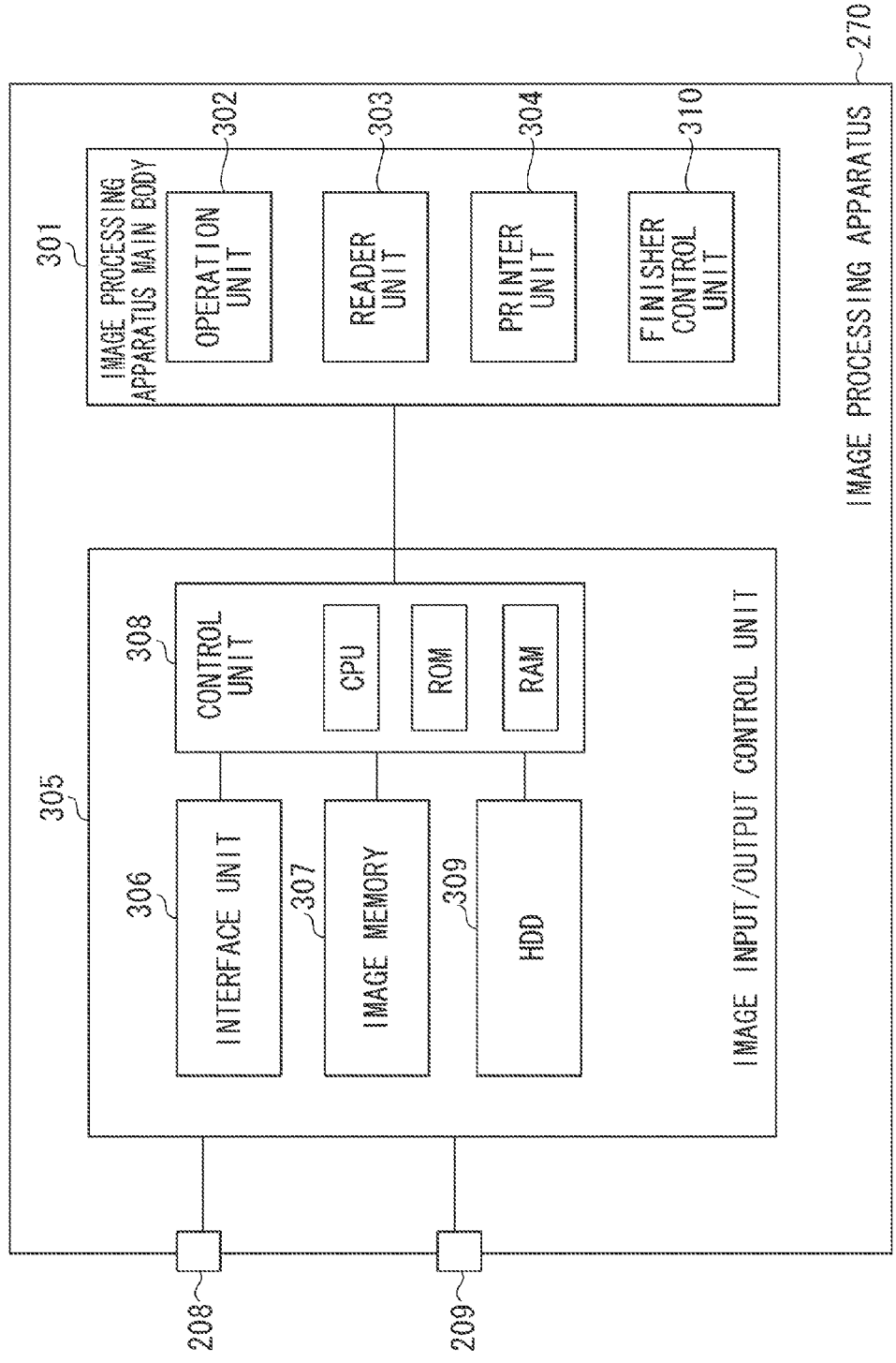
FIG. 3 is a block diagram showing a configuration of the image processing apparatus which illustrates an exemplary embodiment of the present invention.

FIG. 3 is a block diagram illustrating a configuration of the image processing apparatus 207. In FIG. 3, the image processing apparatus 207 according to the present exemplary embodiment includes an image processing apparatus main body 301 and an image input/output control unit 305.

The image processing apparatus main body 301 includes an operation unit 302, a reader unit 303, a printer unit 304, and a finisher control unit 310. The operation unit 302 controls an operation panel 401 illustrated in FIG. 4. The reader unit 303 reads a document image, and outputs image data according to the document image to the printer unit 304 and the image input/output control unit 305. The printer unit 304 records an image according to image data from the reader unit 303 and the image input/output control unit 305 on a recording sheet. The finisher control unit 310 controls a post-processing apparatus of the sheet recorded by the printer unit 304.

The image input/output control unit 305 is connected to the reader unit 303. The image input/output control unit 305 includes an interface unit 306, an image memory 307, a control unit 308, and an HDD 309. The HDD 309 stores settings of the image processing apparatus 207 (for example, an address book, an operation history, user settings, identification (ID) settings, and network settings).

The interface unit 306 is an interface between the control unit 308, the print controller 201 and the terminal apparatus 211 on the LAN 212. The interface unit 306 receives code data expressing an image transferred from the print controller 201 via a connector 209. The interface unit 306 renders the received data into image data recordable by the printer 304 and passes the image data to the control unit 308. The interface unit 306 also receives code data expressing image data, transferred from the terminal apparatus 211, from an Ethernet (registered trademark) or other network interface (connector) 208. The interface unit 306 renders the received data into data recordable by the printer unit 304 if needed, and passes the data to the control unit 308. The connector 209 may be a network interface and configured to be connected with the print controller 201 via a network. The connector 209 may be a parallel interface or an interface such as a Universal Serial Bus (USB) interface, and may be configured to be directly connected to the print controller 201 via an interface cable. The number of cables is not limited to one, and a plurality of cables may be used.

The control unit 308 includes a CPU, a read-only memory (ROM), and a random access memory (RAM). The CPU of the control unit 308 loads a program stored in the ROM or another storage medium into the RAM, and executes the program.

The control unit 308 controls a flow of data between the reader unit 303, the interface unit 306, and the image memory 307. Instead of the HDD 309, other nonvolatile memories of which data is not erased after power-off may be provided to store data in the nonvolatile memory. The control unit 308 determines whether printing and post-processing can be performed according to data transmitted from the interface unit 306, while controlling the printer unit 304 and the finisher control unit 310.

Figure 4:
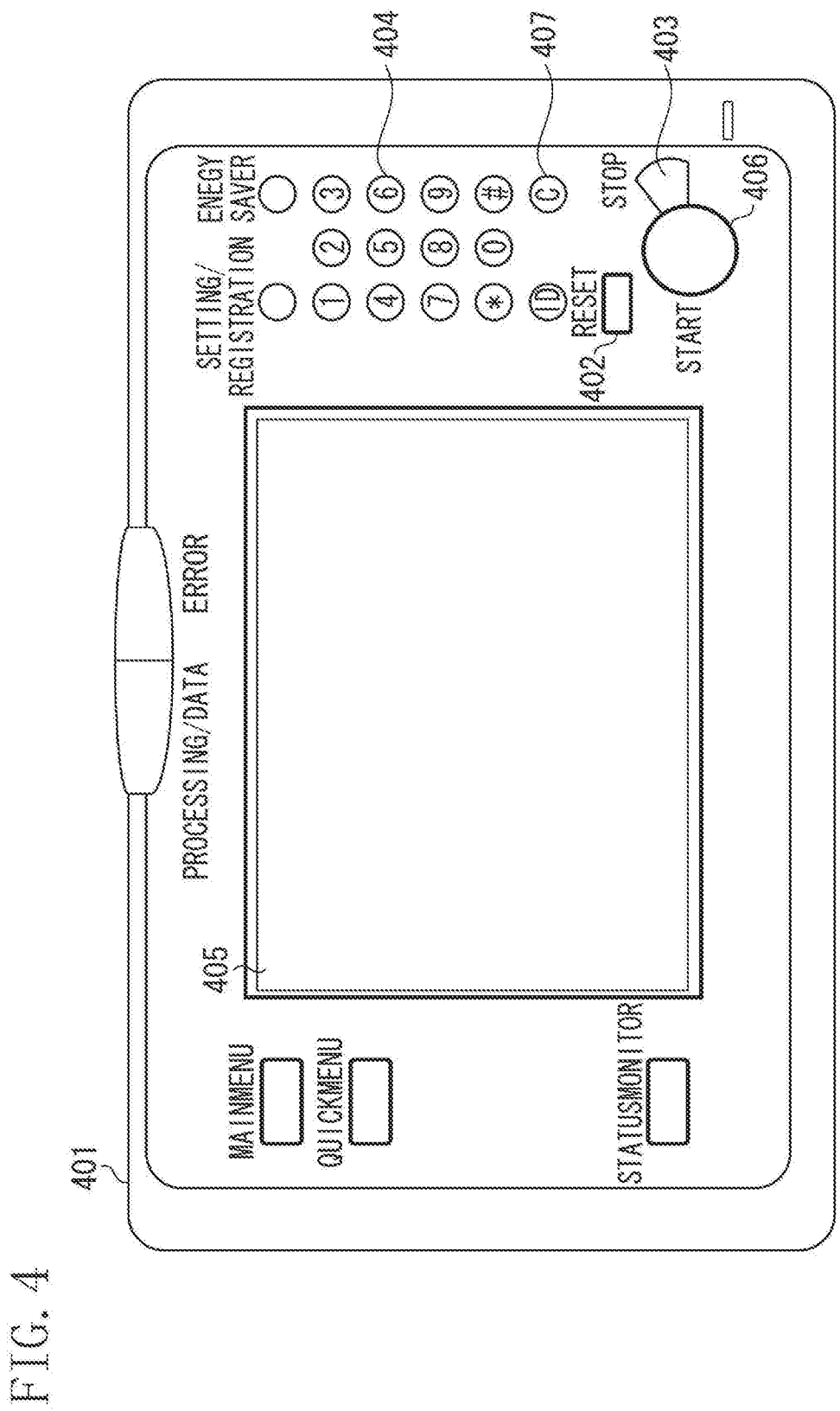
FIG. 4 is a diagram showing an operation panel of the image processing apparatus which illustrates an exemplary embodiment of the present invention.

FIG. 4 illustrates an operation panel 401 connected to the image processing apparatus 207. A reset key 402 is intended to cancel a setting value set by the user. A stop key 403 is used to stop a job being run. A numerical keypad 404 is intended to enter numerical values. An operation screen 405 is a screen of touch panel type. A start key 406 is intended to start a job such as document reading. A clear key 407 is intended to clear a setting. The operation panel 401 further includes hardware keys such as an initial setting/registration button, a button for power saving, a button for displaying a main menu, a quick menu button by which a customized screen can be configured for each user, and a status monitor button for displaying a status of the image processing apparatus 207. The above is the description of the components of the operation panel 401.

Figure 5:
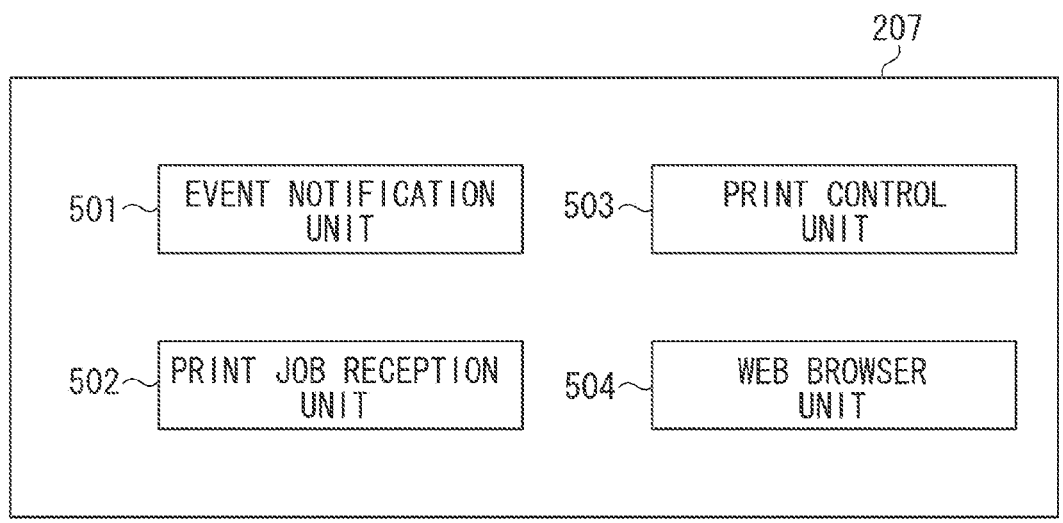
FIG. 5 is a software block diagram of the image processing apparatus which illustrates an exemplary embodiment of the present invention.

FIG. 5 is a block diagram illustrating a software configuration of the image processing apparatus 207. An event notification unit 501 notifies the print controller 201 of various states of the image processing apparatus 207, including an end of a job and paper out. A print job reception unit 502 receives a print job transmitted from the print controller 201. A print control unit 503 controls print processing of the print job received by the print job reception unit 502. A web browser unit 504 interprets and displays a user interface provided by a web server unit 605 of the print controller 201 on the operation unit 302.

Figure 6:
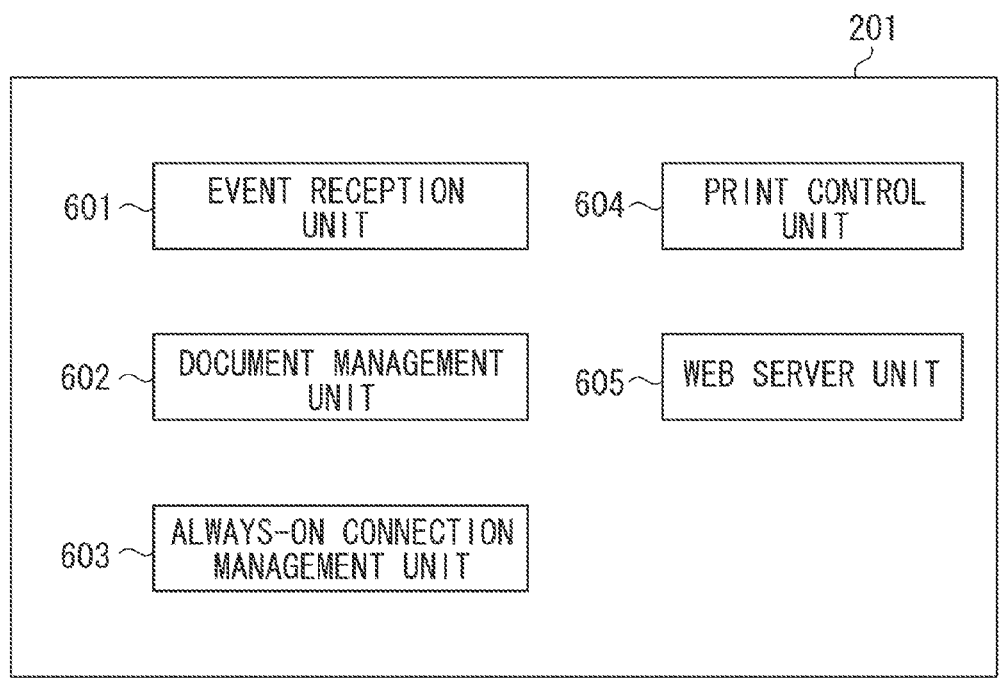
FIG. 6 is a software block diagram of a print controller which illustrates an exemplary embodiment of the present invention.

FIG. 6 is a block diagram illustrating a software configuration of the print controller 201. An event reception unit 601 receives notification of a state of a print job from the image processing apparatus 207. A document management unit 602 manages document information user by user. An always-on connection management unit 603 maintains and manages a state of communication with the image processing apparatus 207. A print control unit 604 generates a print job suited for the image processing apparatus 207, specified by a print instruction, and transmits the print job to the image processing apparatus 207. The web server unit 605 provides a user interface using the Hypertext Transfer Protocol (HTTP) protocol for the terminal apparatus 211. The web server unit 605 also provides a user interface using the HTTP protocol to the image processing apparatus 207.

Figure 7:
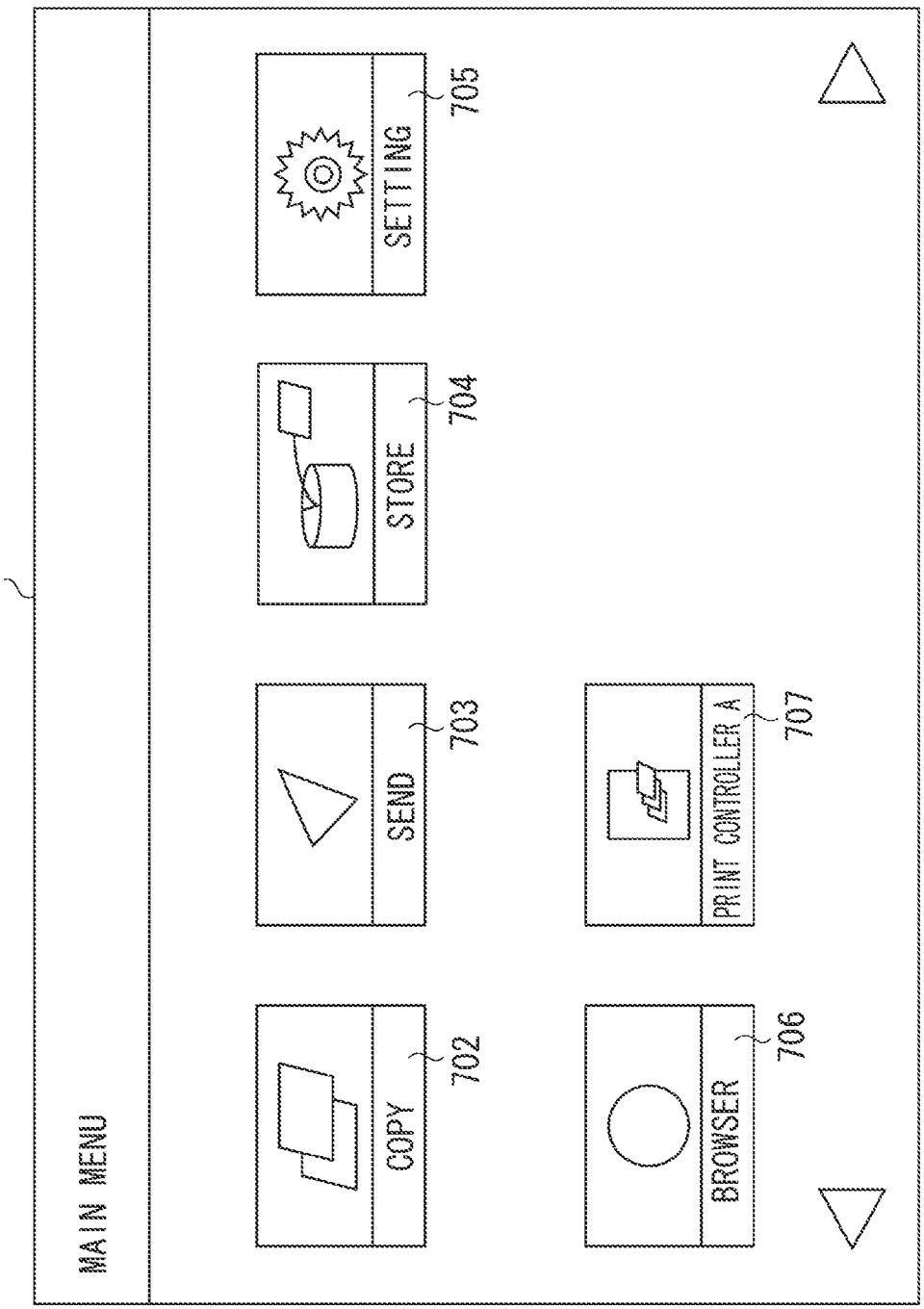
FIG. 7 illustrates an example of a screen displayed on the operation panel of the image processing apparatus which illustrates an exemplary embodiment of the present invention.

FIG. 7 is an example of a top screen 701 displayed on the operation screen 405. A copy button 702 for a copy function, a send button 703 for a send function, a store button 704 for a storage function, and a setting button 705 for a setting function are arranged on the top screen 701 as display items. A browser button 706 for a web browser function and a print controller A button 707 for controlling the print controller 201 are further arranged on the top screen 701 as display items. The print controller A button 707 is a shortcut button for accessing a web service provided by a print controller A via a web browser. In other words, the print controller A button 707 is a favorite function of the web browser. The favorite function of the web browser is managed by using a table of shortcut names, Universal Resource Locators (URLs), and favicon storage locations as illustrated in FIG. 14. If the print controller A button 707 is pressed, the web browser accesses a URL registered in advance. An icon displayed in the print controller A button 707 is a display item called favicon, which expresses a symbol of a web site. A character string displayed in the print controller A button 707 is a display item indicating the name of the shortcut. If the print controller A has not been accessed before, the same icon as the browser button 706 is displayed by default. Once the print controller A is accessed, the favicon is downloaded from the print controller A and the display is switched to the favicon. The downloaded favicon is stored in the HDD 309. The favicon is displayed as the icon until deleted.

Figure 8:
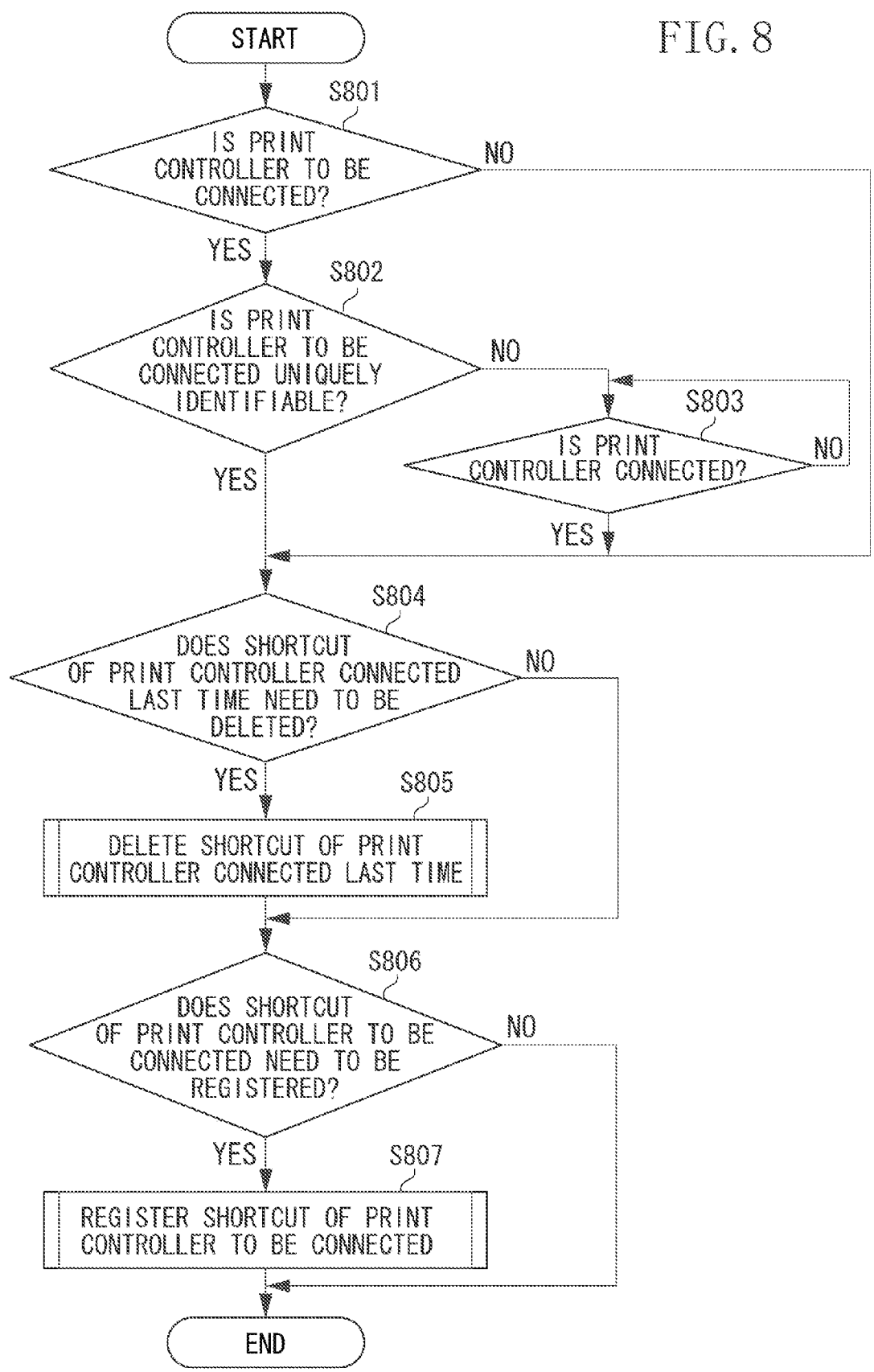
FIG. 8 is a flowchart for describing control of a first exemplary embodiment of the present invention.
Figure 16:
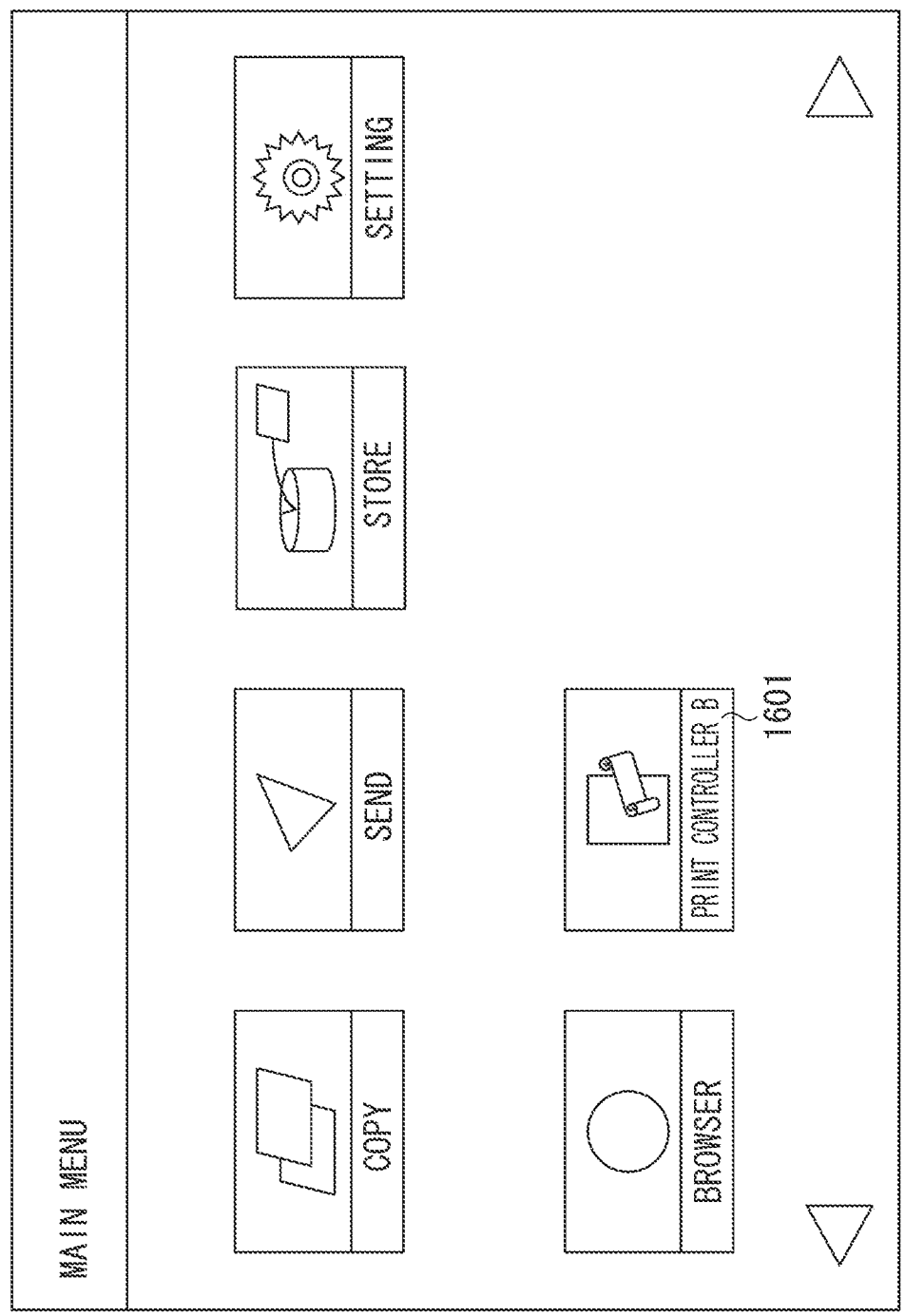
FIG. 16 illustrates an example of a top screen displayed on an operation panel of an image processing apparatus according to the second exemplary embodiment of the present invention.

A first exemplary embodiment will be described. FIG. 8 is a flowchart of the image processing apparatus 207 according to the first exemplary embodiment. The flowchart is executed by the control unit 308. The CPU included in the control unit 308 may perform each step of the processing of FIG. 8 all by itself. However, a plurality of CPUs and hardware circuits may cooperate to execute the processing. In step S801, the CPU of the control unit 308 determines whether a print controller is to be connected to the image processing apparatus 207. To determine whether a print control is to be connected, the CPU of the control unit 308 determines, for example, a value that is set by the user from the operation panel 401 about the presence or absence of a connection of a print controller and is stored in the HDD 309. Such a value may be switched by a dual-in package (DIP) switch. In step S801, if a print controller is determined to be connected (YES in step S801), the processing proceeds to step S802. In step S801, if no print controller is determined to be connected (NO in step S802), the processing proceeds to step S804. In step S802, the CPU of the control unit 308 determines whether the print controller to be connected to the image processing apparatus 207 is uniquely identifiable. The print controller is uniquely identifiable if there is only one type of print controller to be connected to the image processing apparatus 207 or if the user can set the type of the print controller to be connected from the operation panel 401. In step S802, if the print controller to be connected is determined to be uniquely identifiable (YES in step S802), the processing proceeds to step S804. In step S802, if the print controller to be connected is determined not to be uniquely identifiable (NO in step S802), the processing proceeds to step S803. In step S803, the CPU of the control unit 308 determines whether a print controller is connected to the image processing apparatus 207. The CPU of the control unit 308 receives information about the print controller, and identifies the print controller. Then, the processing proceeds to step S804. In step S804, the CPU of the control unit 308 determines whether a shortcut of a print controller which has been connected the last time needs to be deleted. For example, the shortcut needs to be deleted if the print controller A is connected and the print controller A button 707 of FIG. 7 is displayed and in which state the connection is switched to a print controller B and the display is switched to a print controller B button 1601 as illustrated in FIG. 16. Another example is when the connection configuration is changed from FIG. 2A to FIG. 2B and the print controller is no longer needed. In step S804, if it is determined that the shortcut needs to be deleted (YES in step S804), the processing proceeds to step S805. In step S804, if it is determined that the shortcut does not need to be deleted (NO in step S804), the processing proceeds to step S806. In step S805, the CPU of the control unit 308 deletes the shortcut of the print controller connected the last time. More specifically, the CPU of the control unit 308 deletes the name, URL, and favicon of the print controller from the favorites of the web browser. In step S806, the CPU of the control unit 308 determines whether the shortcut of the print controller to be connected needs to be registered. For example, the image processing apparatus 207 may store in advance whether or not the shortcut is registered according to the print controller to be connected. Alternatively, whether the shortcut is to be registered may be notified from the print controller connected in step S803. In step S806, if it is determined that the shortcut of the print controller to be connected needs to be registered (YES in step S806), the processing proceeds to step S807. In step S806, if it is determined that the shortcut does not need to be registered (NO in step S806), the processing ends. In step S807, the CPU of the control unit 308 registers the shortcut of the print controller to be connected. The URL of the print controller may be stored in the image processing apparatus 207 in advance. Alternatively, the URL may be notified from the print controller when the print controller is connected in step S803.

As described above, according to the first exemplary embodiment, the shortcut to be registered is changed depending on the print controller to be connected. Accordingly, when the top screen 701 is displayed in the operation screen 405, a shortcut button corresponding to the print controller to be connected can thus be appropriately displayed.

Figure 17:
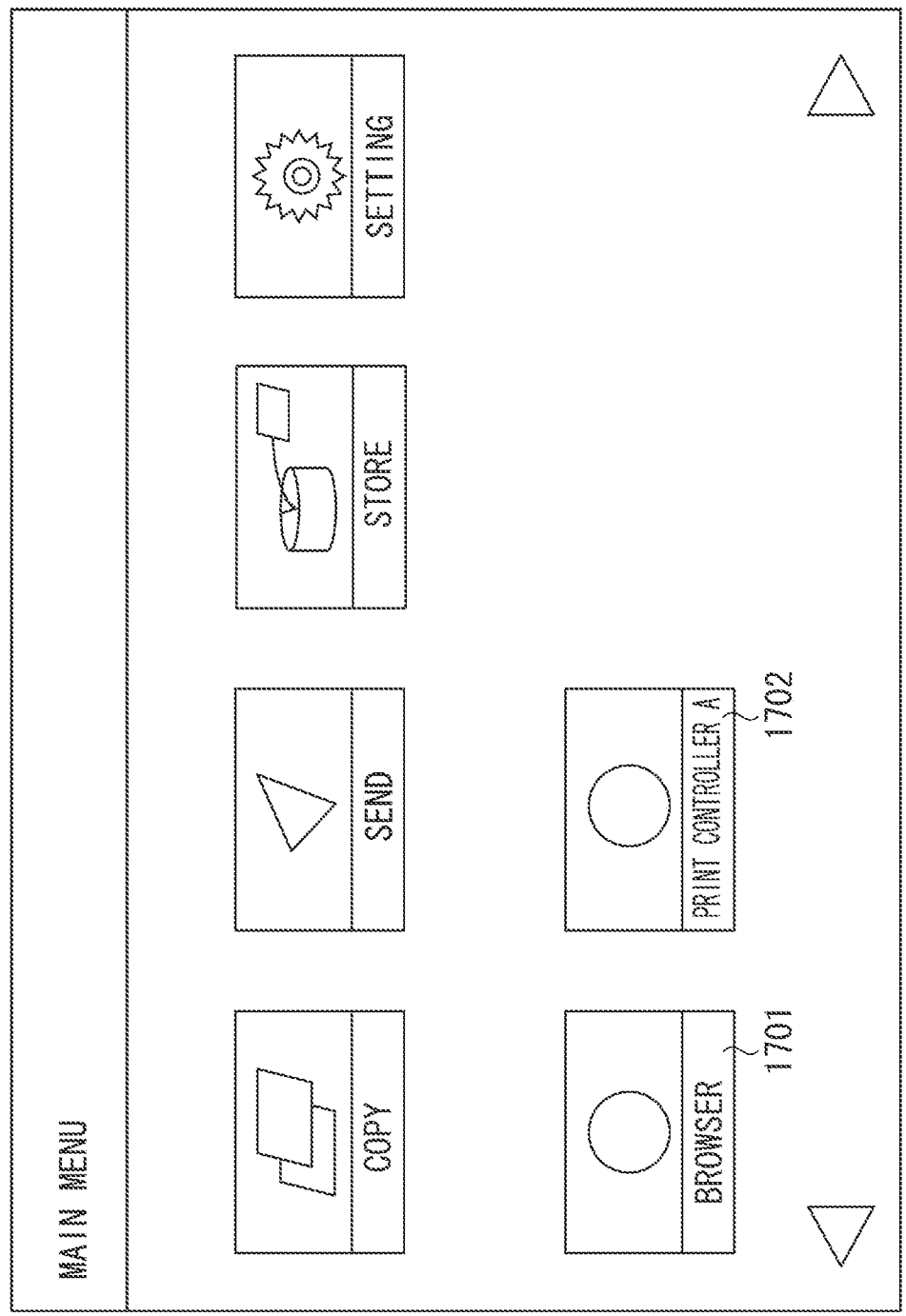
FIG. 17 illustrates an example of a screen displayed on the operation panel of the image processing apparatus before acquisition of a favicon in the second exemplary embodiment of the present invention.

A second exemplary embodiment will be described below. In the first exemplary embodiment, the shortcut to be registered can be switched according to the print controller to be connected. However, if a shortcut is deleted, not only the URL but the favicon is deleted as well. For example, suppose that the print controllers are switched like A→B→A. When the print controller A is connected for the second time, a default icon is registered as shown in FIG. 17 because the favicon of the print controller A has been deleted. Since the same icon as that of a web browser button 1701 is registered as a print controller B button 1702, the visibility to the user deteriorates.

Figure 9:
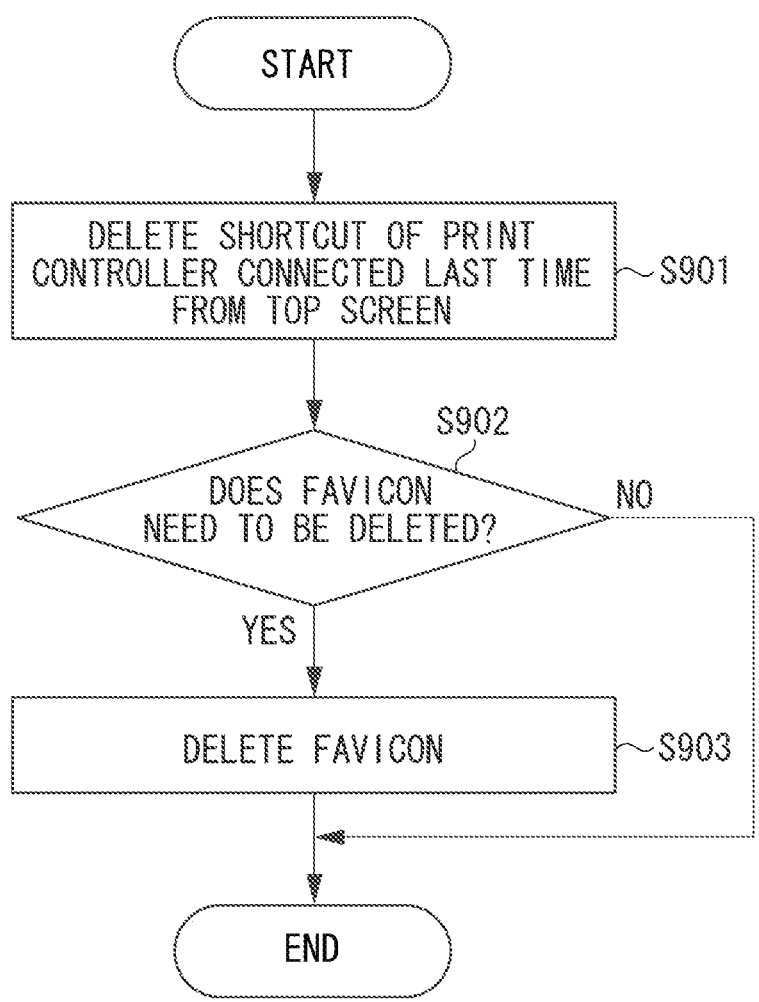
FIG. 9 is a flowchart for describing control of deleting a favicon according to a second exemplary embodiment of the present invention.
Figure 10:
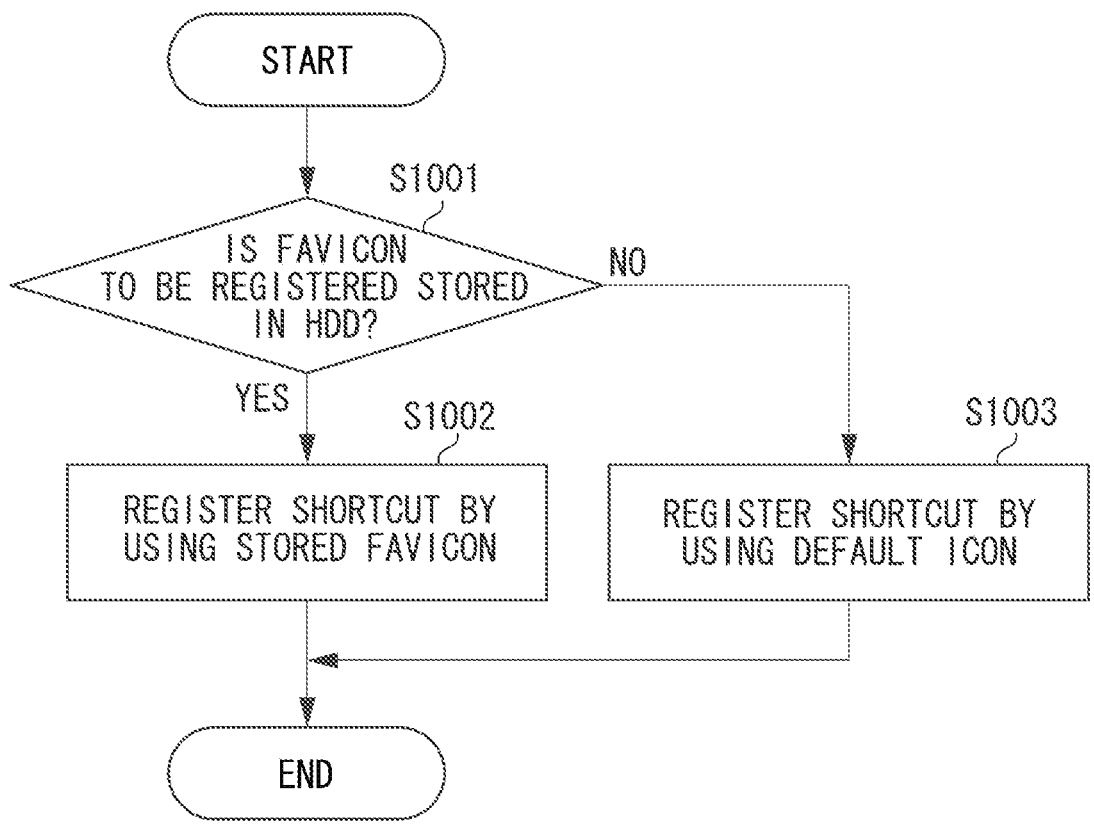
FIG. 10 is a flowchart for describing control of registering a shortcut according to the second exemplary embodiment of the present invention.

To solve such a problem, in the second exemplary embodiment, the processing of deleting a shortcut in step S805 of the first exemplary embodiment is performed by determining whether to delete the favicon as in the flowchart illustrated in FIG. 9. In step S807, a shortcut is registered by determining whether the favicon is already stored as shown in the flowchart illustrated in FIG. 10. The processing illustrated in the flowcharts of FIGS. 9 and 10 is executed by the CPU of the control unit 308. The CPU included in the control unit 308 may execute each step of the processing of FIGS. 9 and 10 all by itself. However, a plurality of CPUs may cooperate to execute the processing.

In step S901 of FIG. 9, the CPU of the control unit 308 deletes the shortcut of the print controller which has been connected the last time from the top screen 701. It is the URL only that is deleted at this time. In step S902, the CPU of the control unit 308 determines whether the favicon needs to be deleted. The CPU of the control unit 308 makes the determination based on whether the URL deleted in step S901 is that of a print controller. For example, a favorite management table intended for print controllers may be registered separately from other management tables, and may be used for the determination. Alternatively, as illustrated in FIG. 15, a favorite table may include an additional flag for indicating whether a favicon needs to be deleted. The flag may be registered to be TRUE in a case of registering a print controller, and FALSE in other cases, and may be used for the determination of step S902. In step S902, if it is determined that the favicon needs to be deleted (YES in step S902), the processing proceeds to step S903. In step S902, if it is determined that the favicon does not need to be deleted (NO in step S902), the processing ends. In step S903, the CPU of the control unit 308 deletes the favicon corresponding to the URL deleted in step S901.

In step S1001 of FIG. 10, the CPU of the control unit 308 determines whether the favicon corresponding to the URL of which the shortcut is to be registered is stored in the HDD 309. In step S1001, if the favicon is determined to be stored (YES in step S1001), the processing proceeds to step S1002. In step S1001, if the favicon is determined to not be stored (NO in step S1001), the processing proceeds to step S1003. In step S1002, the CPU of the control unit 308 registers the shortcut by using the favicon stored in the HDD 309. In step S1003, the CPU of the control unit 308 registers the shortcut by using the default icon.

As described above, according to the second exemplary embodiment, if the shortcut of a print controller is deleted, the favicon will not be deleted. Consequently, if a print controller that has been connected before is connected again to register a shortcut, the favicon that has been downloaded and used for display before can be used to display the icon of the print controller connected again. In other words, if the same print controller is connected again, the icon or symbol of the print controller can be displayed on the top screen 701 without selecting the shortcut button by the user to access the print controller.

Figure 11:
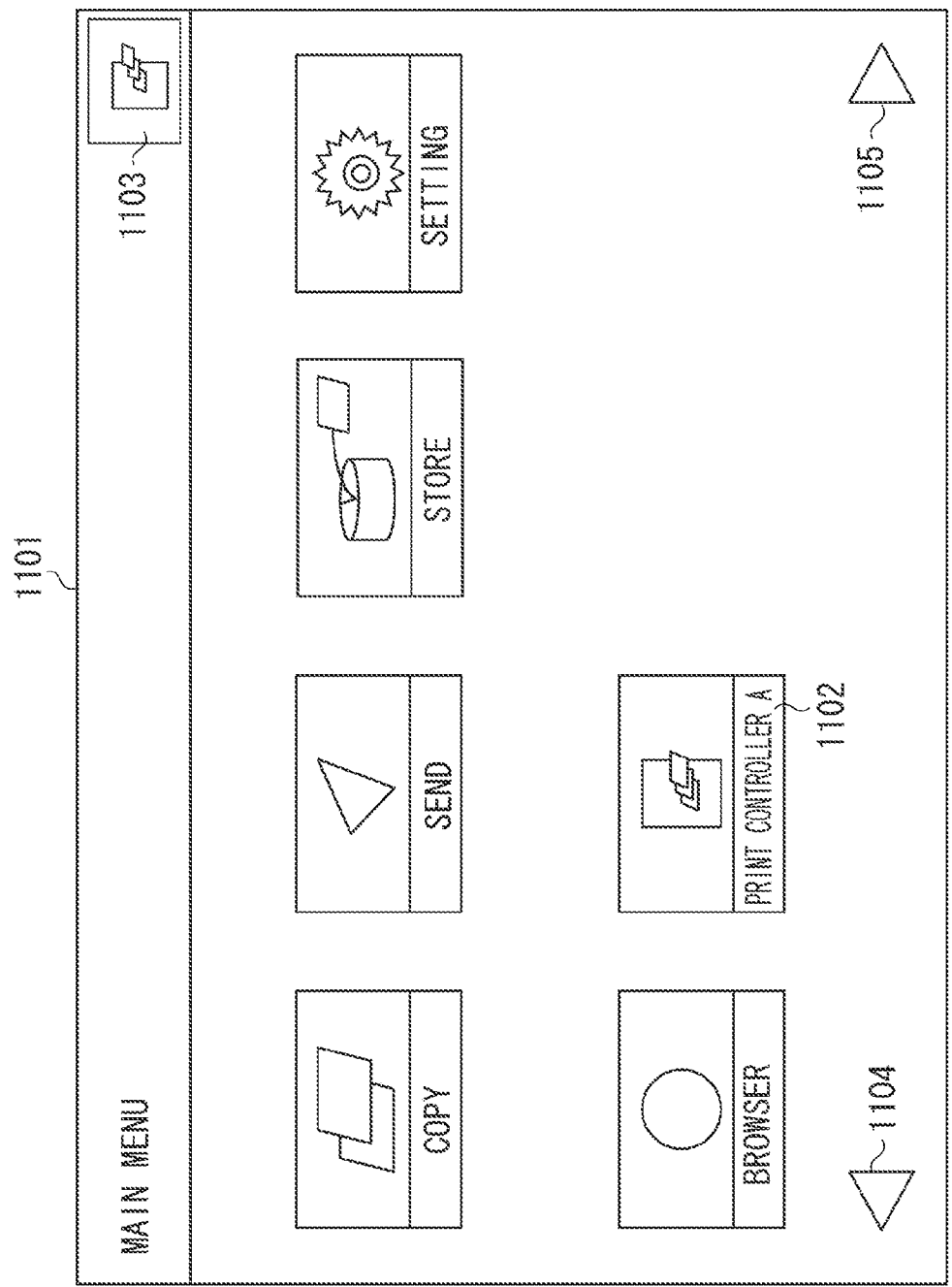
FIG. 11 illustrates an example of a screen displayed on an operation panel according to a third exemplary embodiment of the present invention.

A third exemplary embodiment will be described below. The second exemplary embodiment has described the case where whether a favicon needs to be deleted is determined and the favicon is not deleted. Depending on registration destinations, favicons may have different display sizes with a plurality of different resolutions. A browser using the favicons may include the unnecessary resolutions. The third exemplary embodiment is directed to leaving only favicons of necessary resolutions to save the storage area. For example, FIG. 11 illustrates a top screen 1101 displayed on the operation panel 405. There are two buttons 1102 and 1103 for accessing the print controller A. The display of the button 1102 is switched when the top screen 1101 is scrolled by scroll buttons 1104 and 1105. The button 1103 is always displayed. The buttons 1102 and 1103 include icons of different sizes. The handling of favicons according to the third exemplary embodiment will be described with reference to the flowchart of FIG. 12. The CPU of the control unit 308 of the image processing apparatus 207 executes each step of the flowchart. The CPU included in the control unit 308 may execute each step of the processing of FIG. 12 all by itself. Alternatively, a plurality of CPUs may cooperate to execute the processing. In step S1201, the CPU of the control unit 308 obtains favicons from a print controller, and stores the favicons in the HDD 309. FIG. 13A illustrates an example of a list of favicons obtained from the print controller A. The filenames are "date and time of acquisition_favicon_resolution.png". In step S1202, the CPU of the control unit 308 determines whether the obtained favicons have been registered in all icons to be registered. In step S1202, if there is still any icon to be registered (NO in step S1202), the processing proceeds to step S1203. In step S1202, if the favicons have been registered in all the icons to be registered (YES in step S1202), the processing proceeds to step S1204. In step S1203, the CPU of the control unit 308 updates the icons by using the obtained favicons. Examples of the icons updated in steps S1202 and S1203 are the buttons 1102 and 1103 of FIG. 11. In step S1204, the CPU of the control unit 308 deletes a favicon or favicons not used in steps S1202 and S1203. For example, suppose that the button 1102 needs a favicon of 96×96 pixels and the button 1103 a favicon of 48×48 pixels in the list of favicons in FIG. 13A. In such a case, the CPU of the control unit 308 deletes the other favicons and stores the favicons illustrated in FIG. 13B.

As described above, according to the third exemplary embodiment, only the necessary ones among the obtained favicons are left to save the storage area.

A fourth exemplary embodiment will be described below. In the first exemplary embodiment, the URL that is no longer necessary is deleted from the favorites. If the URL is to be obtained from the print controller, the URL cannot be added to the favorites until the print controller is connected. In view of this, in the fourth exemplary embodiment, a favorite management table includes a display flag as illustrated in FIG. 18. If the display flag is TRUE, the favicon is displayed on the operation panel 405. If the display flag is FALSE, the favicon is not displayed. In step S805 of the first exemplary embodiment, the CPU of the control unit 308 switches the display flag of the print controller connected the last time in the favorite management table to FALSE. Since the display flag is switched to FALSE, the shortcut is deleted from the operation panel 405. In step S807, the CPU of the control unit 308 registers the connected print controller in the favorites with the display flag of TRUE. Since the print controller is registered with the display flag of TRUE, its shortcut is registered on the operation panel 405.

As described above, according to the fourth exemplary embodiment, the URL is not deleted from the favorites. This enables registration of the shortcut before the connection of the print controller. Such a configuration is particularly effective if the print controller can be uniquely determined.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to exemplary embodiments of the present invention, it is possible to display the display item depending on the print controller connected to the image processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-168292, filed Aug. 27, 2015, which is hereby incorporated by reference herein in its entirety.

What is claimed is:

1. An image processing apparatus comprising:
a display device;
a storage device; and
at least one hardware processor,
the at least one hardware processor acting as:
a registration unit configured to register information about a print controller communicably connected to the image processing apparatus; and
a control unit configured to perform a control to display on the display device a display item related to a print controller about which information is registered by the registration unit and that is able to communicate with the image processing apparatus, and not to display on the display device a display item related to a print controller about which information is registered by the registration unit and which is not able to communicate with the image processing apparatus, wherein the display item related to the print controller is a display item for accessing a web service provided by the print controller,
wherein the storage device includes at least
a storage area configured to store data to be used as a display item, and
correspondence information having 1) access information for accessing the web service provided by the print controller and 2) data to be used as a display item of the web service, wherein the access information is associated with the data in the storage area,
wherein the registration unit is configured to register information for accessing the web service provided by the print controller in the correspondence information as information about the print controller, and
wherein the control unit is configured to perform a control to display the display item for accessing the web service on the display device based on the registered information in the correspondence information.

2. The image processing apparatus according to claim 1, wherein the control unit is configured to perform a control to delete, from the correspondence information, information about a print controller about which the information is registered by the registration unit and which is not able to communicate with the image processing apparatus, and then display the display item for accessing the web service on the display device based on the information stored in the correspondence information.

3. The image processing apparatus according to claim 1, wherein the control unit is configured to perform a control to display a plurality of display items on a screen of the display device in addition to the display item for accessing the web service provided by the print controller, the plurality of display items including a display item for accessing a web page registered in advance by a user.

4. The image processing apparatus according to claim 3, wherein the control unit is configured to further perform a control to display a plurality of display items on the screen of the display device, the plurality of display items including a display item for accessing a service provided by an internal application included in the image processing apparatus.

5. The image processing apparatus according to claim 1, wherein the control unit is configured to, upon condition that a display item is controlled not to be displayed and if the display item controlled not to be displayed is the display item of the web service provided by the print controller, perform a control to delete information corresponding to the print controller from the correspondence information and not delete data to be used as the display item of the web service provided by the print controller, the data being stored in the storage area, and if the display item controlled not to be displayed is a display item for accessing a web page registered in advance by a user, perform a control to delete information corresponding to the web page from the correspondence information and also delete data to be used as the display item for accessing the web page, the data being stored in the storage area.

6. The image processing apparatus according to claim 1, wherein the at least one hardware processor further acts as:
a determination unit configured to determine whether the image processing apparatus and the print controller are able to communicate with each other,
wherein the registration unit is configured to register the information about the print controller based on the determination made by the determination unit that the image processing apparatus and the print controller are able to communicate with each other.

7. The image processing apparatus according to claim 6, wherein the at least one hardware processor further acts as:
a setting unit configured to make a setting about a connection of the print controller,
wherein the determination unit is configured to determine whether the image processing apparatus and the print controller are able to communicate with each other, based on the setting made by the setting unit.

8. The image processing apparatus according to claim 7, wherein the determination unit is configured to further receive information from the print controller connected to the image processing apparatus, and determine whether the image processing apparatus and the print controller are able to communicate with each other, based on the received information.

9. A method for controlling an image processing apparatus having a display device and a storage device, the method comprising executing, by at least one processor, instructions stored in a memory of the image processing apparatus to cause processing including:
registering information about a print controller communicably connected to the image processing apparatus; and
performing a control to display on the display device a display item related to the print controller about which information is stored by the registering and which is able to communicate with the image processing apparatus, and not to display on the display device a display item related to a print controller about which information is stored by the registering and which is not able to communicate with the image processing apparatus, wherein the display item related to the print controller is a display item for accessing a web service provided by the print controller,
wherein the storage device includes at least
a storage area configured to store data to be used as a display item, and
correspondence information having 1) access information for accessing the web service provided by the print controller and 2) data to be used as a display item of the web service, wherein the access information is associated with the data in the storage area,
wherein the registering registers information for accessing the web service provided by the print controller in the correspondence information as information about the print controller, and
wherein the controlling performs a control to display the display item for accessing the web service on the display device based on the registered information in the correspondence information.

10. A non-transitory computer-readable storage medium storing a program for causing a computer to execute a method for controlling an image processing apparatus having a display device and a storage device, the method comprising:
registering information about a print controller communicably connected to the image processing apparatus; and
performing a control to display on the display device a display item related to the print controller about which information is stored by the registering and which is able to communicate with the image processing apparatus, and not to display on the display device a display item related to a print controller about which information is stored by the registering and which is not able to communicate with the image processing apparatus, wherein the display item related to the print controller is a display item for accessing a web service provided by the print controller,
wherein the storage device includes at least
a storage area configured to store data to be used as a display item, and
correspondence information having 1) access information for accessing the web service provided by the print controller and 2) data to be used as a display item of the web service, wherein the access information is associated with the data in the storage area,
wherein the registering register information for accessing the web service provided by the print controller in the correspondence information as information about the print controller, and
wherein the controlling performs a control to display the display item for accessing the web service on the display device based on the registered information in the correspondence information.

* * * * *